March 6, 1962

M. L. KASBOHM ETAL 3,023,836

PROCESS AND APPARATUS FOR COOLING AND
REMOVING CONDENSABLES FROM GASES

Filed Nov. 26, 1958

INVENTORS
MARTIN L. KASBOHM
CHARLES R. BAKER
REAGAN HOUSTON

BY *Herbert J. Evers*
ATTORNEY

March 6, 1962

M. L. KASBOHM ETAL 3,023,836

PROCESS AND APPARATUS FOR COOLING AND
REMOVING CONDENSABLES FROM GASES

Filed Nov. 26, 1958

INVENTORS
MARTIN L. KASBOHM
CHARLES R. BAKER
REAGAN HOUSTON

BY Herbert J. Evers
ATTORNEY

United States Patent Office 3,023,836
Patented Mar. 6, 1962

3,023,836
PROCESS AND APPARATUS FOR COOLING AND REMOVING CONDENSABLES FROM GASES
Martin L. Kasbohm, Indianapolis, Ind., and Charles R. Baker, Kenmore, and Reagan Houston, Williamsville, N.Y., assignors to Union Carbide Corporation, a corporation of New York
Filed Nov. 26, 1958, Ser. No. 776,549
17 Claims. (Cl. 183—2)

This invention relates to an improved process of and apparatus for cooling and removing condensables from gases, and more particularly to improvements of such process and apparatus providing higher heat transfer efficiency and self-cleaning of heat exchange processes.

Many processes such as hydrocarbon cracking, solvent recovery from gases, gasoline recovery from natural gas, and air separation require efficient and economical systems for cooling product gases and for removal of condensable components from such gases. For example in the case of air separation, atmospheric air contains substantial quantities of water, carbon dioxide and other low-boiling impurities, and unless these impurities are removed at substantially the same rate as they are deposited, they will accumulate as solids on the heat transfer surfaces and possibly the rectification trays, thus eventually making the process inoperative. In hydrocarbon cracking it may be desirable to recover pure acetylene, for example, from the cracking products, in which case it is necessary to remove the heavier condensables from the acetylene-containing gases.

Pebble-type heat exchangers of the moving bed type and regenerators of the fixed bed type have previously been used to concurrently cool and remove condensables from gas streams. In the moving bed type heat exchanger, the heat-exchange process is continuous and the pebble heat exchange medium is continuously circulated countercurrently to the flow of gases being treated. The pebbles are separately cooled in one zone and then exposed to such gas in another zone. In this fashion the pebble flow can be likened to a heat exchange fluid. Cleanup of the pebbles to remove any condensables deposited from the gas is accomplished by a separate cleaning step externally to the pebble-bed heat exchanger. Such prior art moving bed heat exchangers, however, have several disadvantages, among which are the necessity for heavy duty elevators to continuously move and recycle large quantities of pebbles, and the resulting high power costs. This is due to the necessity of recycling all of the pebbles externally to the heat exchange zone for regeneration of their heat exchange capacity. Another disadvantage in some applications is that the countercurrent heat exchange between the pebbles and the gases cannot be effected with very low and efficient temperature differences since the heat capacity of the pebbles which is relied upon for heat exchange varies with temperature in a manner different from that of the gases. A third disadvantage of this prior art moving bed heat exchanger is that if the pebbles move from the cold to the warm end of the heat exchanger zone, in continuous countercurrent heat exchange relationship with hot gases, the previously deposited condensable material tends to vaporize and move back toward the cold end of the exchanger zone thus building up internal concentrations of condensable impurities which will seriously reduce the overall heat transfer efficiency. This is true in processing product gas streams from hydrocarbon cracking operations wherein low boiling hydrocarbon impurities are being removed in the cooling cycle. A fourth disadvantage of prior art moving bed heat exchangers is the severe abrasion occurring due to rapid movement of the pebbles, requiring frequent replacement of the pebbles and necessitating special means to remove dust which otherwise may damage or foul other equipment in the process.

Fixed bed pebble heat exchangers are also extensively used in industry, and for example operate as follows: a cold out-flowing gas e.g. nitrogen is passed through the pebble bed as a gas purge stroke to simultaneously cool the bed to the desired temperature and remove any condensables previously deposited therein. Air is then passed in the opposite direction through the cooled pebble bed as an air intake stroke for cooling and deposition of its condensable impurities therein. In order to avoid a buildup of solid carbon dioxide particles in the regenerators, the latter must be "self-cleaning." This means that substantially all of the condensables deposited in the regenerator during an air intake stroke must be evaporated and swept out during the next succeeding purge gas stroke. The self-cleaning condition may not be achieved by simply passing all of the out-going separated air components through the regenerator because compressed air, especially at low temperatures, has a substantially greater specific heat than the non-compressed separation products e.g. oxygen and nitrogen. This causes excessive temperature differences at the cold end of the regenerators which are extremely unfavorable for removal of deposits. In order to maintain the regenerative heat exchange zone in a self-cleaning state, the purge gas must have a larger actual volume (afforded by its lower pressure) than the air being treated and the average temperature difference between the gas streams at any point in the pebble bed must be closely controlled. These temperature differences must be controlled within a range below maximum values which are determined by the pressure and volume differences between the streams. The problem of self-cleaning also exists when other fluids are processed through fixed bed pebble regenerators. Thus, it is apparent that such exchangers have several limiting characteristics. For example, self-cleaning fixed bed units require a purge gas having a lower pressure and larger volume than the gas being treated, and control of the gas temperature difference is difficult and expensive. Also, from a practical standpoint the pebbles cannot be kept entirely clean and will eventually foul due to poor temperature control or the presence of non-volatile deposits. In this prior method little freedom of temperature difference for optimum heat transfer is available since the temperature difference must be determined by self-cleaning considerations. Finally, prior art fixed bed regenerators cannot be readily used to remove low boiling condensables from low pressure gas streams since the pressure differential between purge gas and product streams would be too low to enable "self-cleaning" action to take place.

One object of the present invention is to provide an improved process and apparatus for cooling and cleaning a gas stream of condensables, in which the heat transfer zone is maintained in the self-cleaning state.

Another object of this invention is to provide a process and apparatus for cooling and cleaning a gas stream of condensables which retains the advantages of low cost heat transfer obtained with pebble-bed regenerators while maintaining such regenerators in a self-cleaning condition, but without the necessity of closely controlling the gas flows therein to obtain such a condition.

A further object of this invention is to provide a moving pebble bed regenerative system in which highly efficient, low temperature differences are maintained between gas streams, and the power costs of operating such system are minimized.

Still further objects and advantages of the present invention will be apparent from the ensuing description and accompanying drawings.

Broadly stated, the pebble packed regenerators of the present invention operate in a manner similar to that of the fixed bed type, while eliminating or reducing several of the disadvantages thereof. That is, the pebbles are first cooled and cleaned within the regenerator and the treated pebbles are then contacted with and rewarmed by a condensable-containing gas to be purified in the same regenerative zone. Self-cleaning and removal of either solid or liquid condensables deposited on the pebbles are obtained by a slow creeping motion of the pebbles through at least a zone of the regenerator where impurity deposits tend to accumulate, accompanied by a purging action of the waste gas flow.

More specifically, the present invention contemplates a process for cooling a product inlet gas and concurrently removing condensable impurities therefrom by indirect heat exchange with a relatively cool purge gas by passage through a pebble-packed regenerative zone. A relatively warm impurity-laden product inlet gas is passed from the warm end to the cold end of such zone as a gas cooling and cleaning stroke to cool such product gas below the saturation temperature of such impurities for deposition in the zone, and the impurity depleted, cooled product gas is discharged from the cold end. As a gas purge stroke, a relatively cool purge gas stream is passed from the cold to the warm end of the regenerative zone to simultaneously evaporate the previously deposited impurities, and recool the regenerative zone. The heat transfer and cleaning in the regenerative zone is controlled so as to achieve substantially complete removal of the product gas impurities by moving the pebbles through the regenerator. The pebbles are moved through the system at a rate only sufficiently to maintain the regenerative zone in a self-cleaning state. This rate is substantially slower than the rate which would be necessary to maintain countercurrent heat exchange between only the pebbles and the gas, as with the well-known moving bed type heat exchangers. Thus, the pebbles in each passage through the regenerator may undergo numerous cycles of warming and cooling. For example, in one creeping pebble bed embodiment of the present invention in which a hot product gas stream of hydrocarbons containing acetylene and hydrocarbon condensables is cooled and cleaned by indirect heat exchange with purge air at room temperature, the pebbles are moved at about 10% of the rate that would be required for a moving-bed type heat exchanger. This difference in bed velocities results in a substantial power saving over moving-bed type heat exchangers and permits the creeping bed to be operated in a manner very similar to highly efficient fixed bed regenerators.

In a preferred embodiment, the pebbles are moved through the regenerator from a cold section to the warm section of the regenerative zone so as to gradually move the previously deposited impurities to a warmer temperature and thus increase their vapor pressure and evaporation rate into the purge gas. This maximizes the amount of self-cleaning within the regenerator pebble bed.

A creeping bed regenerator system constructed and operated in accordance with the present invention has special commercial utility for low temperature heat exchange in the range below room temperature. Refrigeration is expensive, thus placing a premium on highly efficient heat transfer means whereby a low temperature difference can be maintained between the cooling gas medium and the gases being treated. An efficient means of cleaning condensables deposited on the heat exchanger packing must also be used without increasing bed temperature or refrigeration will be unnecessarily lost on the purge and cool down portion of the operating cycle. This invention advances the state of heat exchanger art in that both efficient heat transfer means and self cleaning of regenerator packing are conveniently achieved.

In the drawings.

In the several figures, similar components are designated with similar numerals for clarity.

Figure 1:
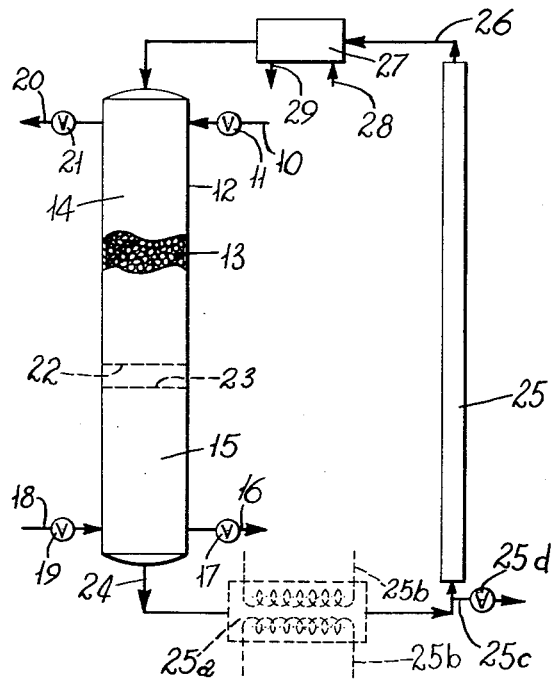
FIG. 1 is a schematic flow diagram of a pebble-packed creeping bed regenerator according to the present invention.

Referring now more specifically to FIG. 1, cooling and cleaning of an acetylene-containing gas stream will be described for illustrative purposes. A relatively cold heat exchange and purge medium such as air at about atmospheric temperature (20° C.) and under a slight positive pressure, e.g. 5 p.s.i.g., enters the system through conduit 10 and control valve 11. The cool air is passed into regenerator shell 12 which is filled with pebbles 13. The term "pebbles" as used herein denotes any substantially solid material of flowable size and form which has sufficient strength to withstand mechanical pressures and temperatures encountered within the apparatus. Alumina is readily available as pebble material and preferred for relatively high temperature operation, but other materials such as metals, natural sand, or gravel, and minerals could be used. Also, the pebbles may have adsorptive or catalytic characteristics. The choice of pebble material will be governed primarily by the temperatures encountered in operation, and a high specific heat is not essential.

Pebble size is determined by heat transfer and pebble bed pressure drop considerations. For example, ½ x 1-inch pebbles are used in a 1-ft. diameter x 6-ft. long regenerator wherein the warm bed end is at about 500° C. and the cold end at about 25° C. Product gas flow through the pebble bed is about 10,000 c.f.h. (NTP).

The cool purge air flows downwardly through the pebble bed 13 as a gas purge stroke until the cold end 14 of the bed is cooled to substantially the temperature of the inlet purge air, the warmed air being discharged from the warm end 15 through conduit 16 and control valve 17 therein. Valves 11 and 17 are then closed and a relatively warm or hot product gas stream such as an acetylene-containing product fraction from a hydrocarbon separation or cracking process enters the warm end 15 of the pebble bed 13 at about 500° C. and 2 p.s.i.g. through conduit 18 and control valve 19 therein. The acetylene stream may contain hydrocarbon condensables such as oils and tars as well as solids such as carbon, and at least most of these impurities are removed from such stream by passage through regenerator 12. Any materials which will condense at a temperature above the pebble temperature at the cold end 14 of bed 13 will be deposited on the pebbles, and the bed will also serve to filter some of the solids from the product gas stream. The cooled and cleaned product acetylene stream after passing from the warm end 15 to the cold end 14 of the pebble bed 13 is discharged through conduit 20 and control valve 21 therein at about 25° C. for further processing or use as desired. It is of course well known in the art that heat transfer efficiency is increased by maintaining relatively small temperature differences between the heat exchanging media at opposite ends of the exchanger. Consequently, the flows of the cooling gas, the pebbles, and the product gas are preferably adjusted so that the outlet temperature of the product gas at the cold end 14 of the pebble bed 13 is approximately the same but slightly higher than the inlet temperature of the cool air. These variables are also preferably adjusted so that the temperatures of the gas streams entering and leaving the warm end 15 are close to each other. A temperature gradient will thus be set up throughout the pebble bed 13 as in fixed-bed regenerators. After each product gas cleaning and cooling stroke, the pebble bed is reconditioned for further use by closing valves 19 and 21 and recirculating cool purge air through the pebble bed 13 in a direction countercurrent to the product gas flow, as previously described.

If the condensed and filtered deposits from the product gas stream were allowed to remain in the pebble bed 13, they would eventually interfere with the heat exchange process. This problem is solved by the combination of purging with the cooling gas and a slow or creeping motion of the pebbles preferably from the cold end 14 toward the warm end 15. For purposes of illustration, it may be assumed that there is a deposit of condensables on the pebbles at level 22 in the pebble bed 13. When the cooling gas enters such bed for a later cooling and purging cycle, the pebbles will have moved to a warmer level 23. This warmup increases the vapor pressure and consequently the evaporation rate of the deposited condensables, and they may be purged at a higher rate than would be possible if the pebbles remained at level 22. This cyclic operation with the deposits gradually shifting toward the warm end will continue until an equilibrium condition is reached where ideally the purge gas will carry out all of the condensable deposits left by the product gas. The filtered material deposited on the pebbles may also be burnt off by the purge gases which become quite hot as they reach the warm end of the regenerator and be swept out by the purge gas. By the time the pebbles reach the warm end 15 of the regenerator they are normally completely cleaned of deposits and are moved therefrom through conduit 24 by a bucket conveyor arrangement or similar means to elevator or air-lift 25 which operates in a manner well-known to those skilled in the art. If the deposits are not completely removed from the pebbles in regenerator 12, a heater or burner 25a may be provided in pebble conduit 24 to complete pebble cleanup. The pebbles passing therethrough may, for example, be heated by contact with electrical resistance coils 25b for evaporation of the deposits or such coils may provide sufficient heat to burn off the deposits. Branch conduit 25c and control valve 25d may be provided for venting gasified impurities.

The warm pebbles are carried by elevator 25 toward the top of regenerator 12 and transferred to conduit 26 for conveyance to pebble cooler 27 where the sensible heat abstracted from the product gas and also added to the pebbles by heater 25a is removed by countercurrent heat exchange with a colder fluid entering cooler 27 through conduit 28 and leaving through conduit 29. The coolant is preferably a portion of the cool purge gas which may be diverted from the main purge gas conduit 10 by means not shown. The recooled pebbles are then returned through conduit 26 to the cold end 14 of regenerator 12 for passage therethrough. Although pebble movement has been described as being from one end to the other end of the regenerator, it is to be understood that such pebbles could be introduced and withdrawn at levels intermediate such ends.

As previously discussed, the pebbles are moved at a creeping rate only sufficiently to maintain the regenerator 12 in a self-cleaning state, and such rate is slow enough so that the pebbles act substantially as a fixed bed with respect to the cool purge gas and the product gas. However, since the creeping bed insures self-cleaning, it is not necessary to have a larger volume of purge gas than product gas and to control the gas flows closely as is required in prior art fixed bed regenerators. The quantitative values for pebble flow will depend upon the desired regenerator warm end and cold end temperatures as well as the nature of the deposits on the pebbles. In addition to aiding the self-cleaning action, the creeping pebble flow serves as part of the cold fluid flow to adjust the enthalpy balance between the hot and cold fluids, and thus helps to set the warm and cold end temperature differences in the regenerator. This is especially advantageous in certain low temperature applications, where, as previously discussed, the greater specific heat of the compressed inlet or product gas at low temperatures creates a large cold end temperature difference unfavorable for self cleaning. The adverse effect of the varying specific heat of the gas is partially or wholly offset by creeping the pebbles from the cold to the warm end. This is because the specific heat variation in the pebbles during their passage through the bed is opposite to that of the compressed inlet gas. Thus, creeping the pebbles from cold to warm end reduces the cold end temperature difference and enhances the purging action of the sweep gas. Only a small pebble flow is needed to create a favorable cold end temperature difference. For example, in a regenerator of an air separation plant using stone pebbles and operating without flow unbalance, only about 4% of the bed volume must be circulated each hour to maintain cold end temperature differences equal to the warm end temperature differences.

For purposes of illustration only, the cyclic operation of a single regeneration has been described. It is to be understood that continuous heat exchange operation will require multiple regenerators with one unit being cleaned while another unit is treating an impurity-containing gas stream.

Creeping bed regenerators are specially useful in separation processes for cooling the product gases of a hydrocarbon cracking system from room temperature down to a relatively low temperature, such as about −150° F., prior to solvent absorption of the desired product, for example acetylene. In this embodiment of the creeping bed regenerator, cold vent gases from the solvent absorption system, for example, may be used as purge gas for the regenerator. Water, oils, diacetylene, and other impurities are conveniently removed as condensables on the pebble bed.

The temperature of the cracked product gases at the cold outlet end of the regenerator is kept as low as possible to freeze out substantially all of the impurities.

Figure 2:
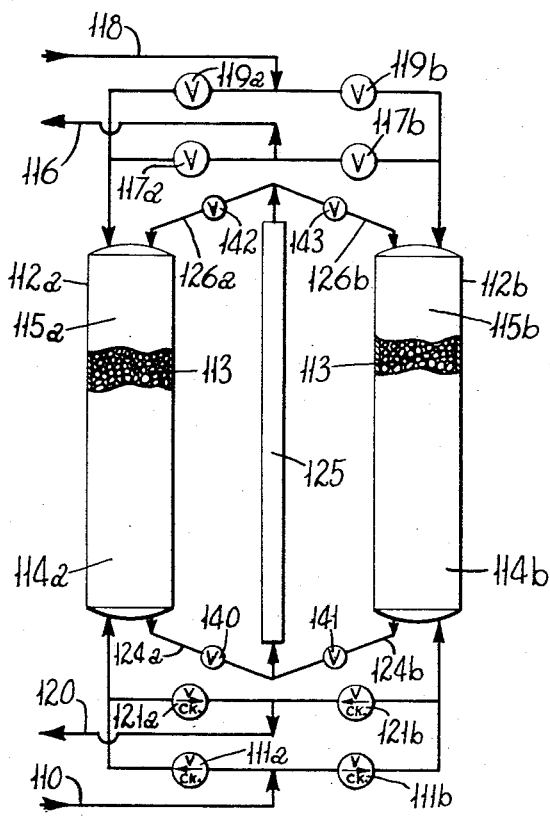
FIG. 2 is a schematic flow diagram of a pebble-packed creeping bed regenerator pair.

FIGURE 2 illustrates another embodiment of the present invention, in which a pair of creeping bed regenerators are provided with pebble flow through the regenerative zone from the warm end to the cold end thereof. This particular embodiment would be suitable for use in an air separation system and will not be described in detail with respect thereto, although it is not limited to this particular application.

Inlet air which has previously been compressed to a low pressure such as 75 p.s.i.g. and subsequently dried by means not illustrated, is introduced through conduit 118 and either of warm end reversing valves 119a or 119b to either regenerator 112a or 112b, respectively, for cooling therein. The air stream flows through the pebble bed 113 from the warm end 115a or 115b to the cold end 114a or 114b for cooling and resulting deposition of carbon dioxide and other air condensables in such bed. The cooled and cleaned air stream is discharged from the cold end 114a or 114b and passed through cold end check valve 121a or 121b, respectively, into conduit 120 for direction to a rectification column (not shown). The cold, clean air is separated into air components such as oxygen and nitrogen in the rectification column, and at least part of one of these components is returned through conduit 110 to the regenerators as a cold purge gas stream. The latter flows through either of cold end check valves 111a or 111b into the regenerator on purge stroke, and passes through the packed bed 113 in a direction countercurrent to the previously flowing air stream. The pebbles are concurrently cleaned and recooled by the purge gas which is discharged from the warm end 115a or 115b of the regenerator through warm end reversing valve 117a or 117b into conduit 116 for release to the atmosphere or further processed as warmed impurity-laden purge gas. The inlet air and purge gas flows are periodically switched between the regenerator pair 112a and 112b in a manner well-known to those skilled in the art.

As previously discussed, the mere return of all the separated air components countercurrent to the air flow through the regenerator will not alone remove all the deposited condensables, and the regenerators are maintained in a self-cleaning state by the improvement of a creeping motion of the pebbles 113 from the warm ends 115a and 115b to the cold ends 114a and 114b; the carbon dioxide-laden cold pebbles being removed therefrom through conduits 124a and 124b. These pebbles may contain as much as 5% by weight of deposited carbon dioxide, depending on the amount of condensables removed by the purge gas stream and on the rate of pebble flow. The pebbles are carried in conduit 124a and 124b through valves 140 and 141, respectively, to elevator 125 for transfer to the warm end of the regenerators. External heating means are not required because the normal heat inleak from the atmosphere to the pebbles in the elevator 125 will be sufficient to evaporate the carbon dioxide deposits. The warmed and cleaned recycling pebbles are transferred from the elevator 125 through conduits 126a and 126b as well as control valves 142 and 143 to the warm ends 115a and 115b of the regenerators for passage therethrough as previously described.

Since the only function of the recirculating pebbles is to remove the air condensables not removed by the purge gas, the pebbles are moved at a very slow creeping rate, as compared to the prior art moving pebble bed system proposed for the heat exchanger sections of air separation processes. For example, in an oxygen gas producing plant processing 2 million cubic feet of air per hour wherein the purge gas removes 90% of the deposited condensables, a creeping pebble bed regenerator system for cooling and cleaning the inlet air in accordance with the present invention would only require a pebble recirculation rate of about 150 lbs. per hour for self cleaning. In contrast, a moving pebble heat exchange system of the heretofore proposed type in which recirculation of the pebbles provides both cleaning and all of the necessary heat transfer would require a pebble recirculation rate of 300,000 to 1,200,000 lbs. per hour for the same size plant.

The use of a creeping pebble bed regenerator system offers other important advantages unique to air separation systems. For example, the so-called side-bleed air may be withdrawn from the regenerator at a relatively lower temperature than heretofore practiced, and passed directly to an expander for the production of low temperature refrigeration. The advantage of this procedure is that colder side bleed air carries only a small fraction of the carbon dioxide content that the normal side bleed air contains. For example, if air is bled from the regenerator at the $-150°$ C. level, it has only about 20 p.p.m. of carbon dioxide whereas normal takeoff air at about $-100°$ C. has about 300 p.p.m. carbon dioxide. Thus an advantage resulting from the use of the present invention in air separation systems is the use of much smaller adsorption traps for final cleanup of the side bleed air.

Figure 3:
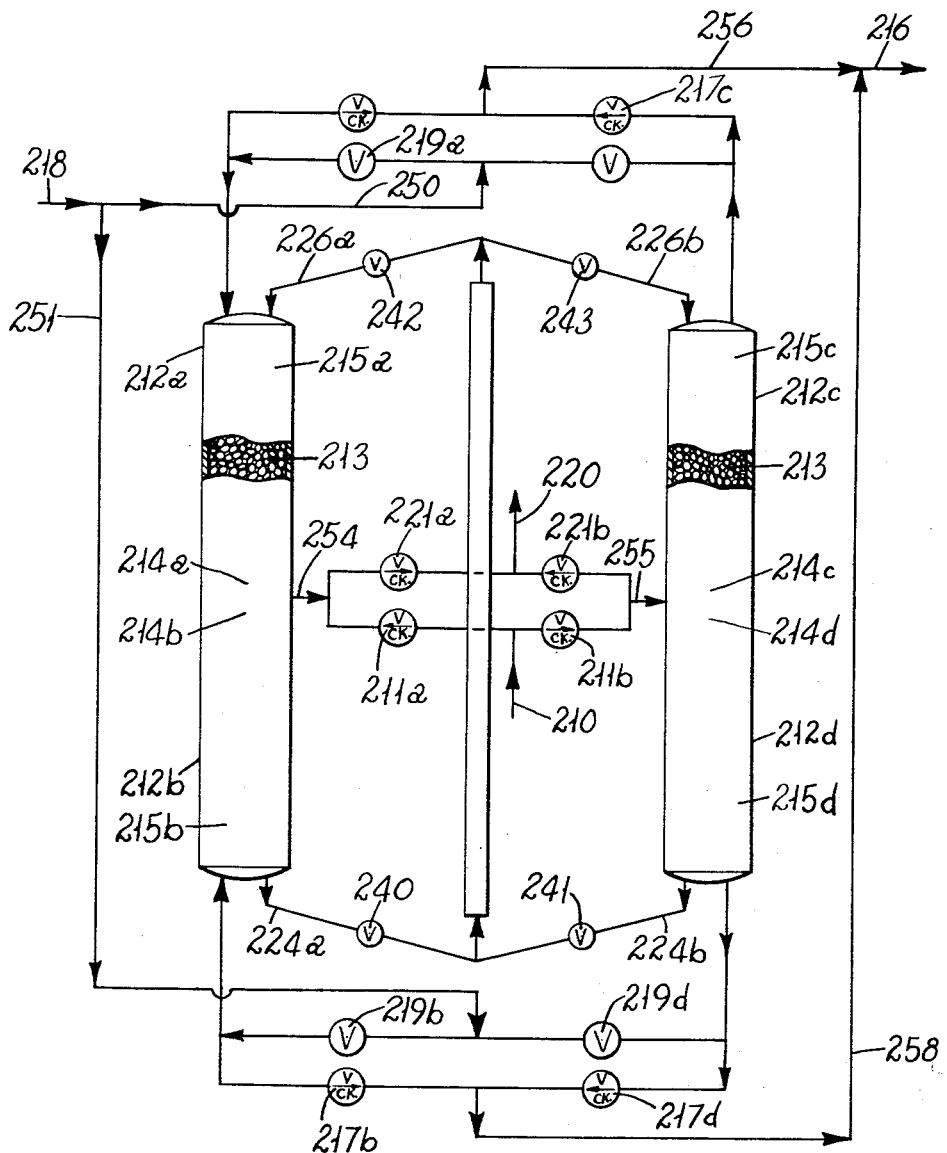
FIG. 3 is a schematic flow diagram of four pebble-packed creeping bed regenerators similar to those shown in FIGS. 1 and 2, but arranged in pairs with the cold end of each regenerator of such pairs contiguous to the cold end of the other regenerator of the same pair.

FIG. 3 illustrates still another embodiment of the present invention, in which at least four pebble-packed regenerators are provided and arranged in pairs with the cold end of each regenerator of the pairs contiguous to the cold end of the other regenerator of the same pair. Thus, regenerators 212a and 212b are arranged with communicating cold ends 214a and 214b, and opposite warm ends 215a and 215b, respectively, while regenerators 212c and 212d are arranged with communicating cold ends 214c and 214d, and opposite warm ends 215c and 215d, respectively. This arrangement and its operation will also be described in conjunction with an air separation system of the type disclosed in U.S. Patent No. 2,735,278 to P. K. Rice. It is to be understood, however, that such description is for illustrative purposes and that the invention is suitable for cooling and cleaning other product gases having condensable impurities.

Compressed air is introduced through conduit 218 and is divided in conduit 250 and 251, passed through warm end reversing valves 219a and 219b in the later mentioned conduits, and directed into the warm ends 215a and 215b, respectively, of regenerators 212a and 212b. The air is concurrently cooled and cleaned on passage through the pebble beds 213, and discharged from both cold ends 214a and 214b into conduit 254 for flow through cold end check valve 221a and discharge conduit 220. Simultaneously, a cold air component purge gas is introduced through conduit 210 and cold end check valve 211b therein, and passed through conduit 255 into the cold ends 214c and 214d of regenerators 212c and 212d, respectively, for flow through the pebble beds 213 to the warm ends 215c and 215d. The purge gas simultaneously removes the condensables and recools the pebbles, as previously described, and the warmed impurity-laden gas is discharged through conduit 256 and warm end reversing valve 217c therein, as well as conduit 258 and warm end reversing valve 217d therein. The two streams join in conduit 216 for discharge from the system. The inlet air and purge gas flow are periodically reversed between the regenerator pairs, so that units 212c and 212d will be on air cooling and cleaning stroke and units 212a and 212b will be on a gas purge stroke.

It will be noted that in FIGS. 1 and 2, a refrigeration loss occurs as a result of removing the pebbles from one end of the regenerator and adding them to the other end. The pebble circulating system of FIG. 3 avoids this loss and circumvents the problems inherent in handling cold pebbles by introduction of the pebbles to the warm end of one regenerator, moving them to the cold end of the same regenerator and then to the contiguous or communicating cold end of a second regenerator and hence to the warm end of the latter unit. The pebbles are then externally returned to the warm end of the first regenerator. Thus, the pebbles are elevated from the warm end of one regenerator to the warm end of another regenerator and no significant refrigeration loss occurs therebetween.

Referring now more specifically to FIG. 3, the pebbles move from the warm ends 215a and 215c of regenerators 212a and 212c, respectively, to their respective cold ends 214a and 214c, and hence to the contiguous cold ends 214b and 214d of regenerators 212b and 212d. During passage of the pebbles through regenerators 212a and 212c most of the carbon dioxide will be removed from the pebbles by the purge gas. Any impurged deposits will be carried mechanically out of regenerators 212a and 212c thus avoiding accumulation in these units. The pebbles then move through regenerators 212b and 212c to warm ends 215b and 215d where they are removed through conduits 224a and 224b, and valves 240 and 241 to elevator 225 for lifting therein. In regenerators 212b and 212d most of the carbon dioxide will be removed by purging from the cold ends where it is deposited or where it enters from regenerators 212a and 212c. Any carbon dioxide not urged in the cold end will be moved on the pebbles toward the warm end where it is quickly evaporated and swept out with the purge gas. Any water which remains on pebbles removed through valves 240 and 241 may be evaporated by exposure to atmospheric heat during the elevating step, and if necessary the pebbles may be further warmed in a heat exchanger (not shown) prior to recycling to the warm ends 215a and 215c of regenerators 212a and 212c, respectively. The recycling is obtained by passing of the warm, clean pebbles through conduits 226a and 226b, as well as control valves 242 and 243, respectively, in such conduits.

The general arrangement of FIG. 3 is also capable of utility when only a single regenerator pair 212a—212b is provided. In such case the adjacent cold ends 214a—214b are separated by a pebble conduit containing a star valve or its equivalent. The star valve permits passage of pebbles from the upper to the lower regenerator but prevents gas flow therethrough. In this embodiment, the regenerator 214a—214b may now be operated with one unit processing inlet air and the other unit simultaneously processing purge gas in a manner well understood by those skilled in the art.

Although preferred embodiments of the invention have been described in detail, it is contemplated that modifications of the process and apparatus may be made and that some features may be employed without others, all within the spirit and scope of the invention. For example, although the pebble bed has been described as continuously creeping, pebble movement may be stopped during the product gas cooling and cleaning stroke, and reestablished for the duration of the purge gas stroke.

What is claimed is:

1. In a process for cooling a product inlet gas and concurrently removing condensable impurities therefrom by indirect heat exchange with a relatively cool purge gas by passage through a pebble-packed regenerative zone, the steps comprising passing a relatively warm impurity-laden product inlet gas from the warm end to the cold end of said pebble-packed regenerative zone as a gas cooling and cleaning stroke to cool such inlet gas below the saturation temperature of such impurities for deposition in such zone; discharging the impurity-depleted cooled inlet gas from the cold end of such zone; as a gas purge stroke, passing a relatively cool purge gas stream from the cold to the warm end of the regenerative zone to simultaneously evaporate the previously deposited impurities for removal, and recool the regenerative zone; and controlling the heat transfer and cleaning in the regenerative zone so as to achieve substantially complete removal of the inlet gas impurities by moving the pebbles through the regenerative zone from one end to the other end thereof and returning the pebbles to said one end of the regenerative zone for recirculation therethrough, the pebbles being moved at a rate only about sufficiently to maintain the regenerative zone in a self-cleaning state.

2. In a process for cooling a product inlet gas and concurrently removing condensable impurities therefrom by indirect heat exchange with a relatively cool purge gas by passage through a pebble-packed regenerative zone, the steps comprising passing a relatively warm impurity-laden product inlet gas from the warm end to the cold end of said pebble-packed regenerative zone as a gas cooling and cleaning stroke to cool such inlet gas below the saturation temperature of such impurities for deposition in such zone; discharging the impurity-depleted cooled inlet gas from the cold end of such zone; as a gas purge stroke, passing a relatively cool purge gas stream from the cold to the warm end of the regenerative zone to simultaneously evaporate the previously deposited impurities for removal, and recool the regenerative zone; and controlling the heat transfer and cleaning in the regenerative zone so as to achieve substantially complete removal of the inlet gas impurities, by moving the pebbles from the cold end to the warm end of the regenerative zone so as to increase the vapor pressure and evaporation rate of the deposited impurities, withdrawing the pebbles from the warm end, and returning the pebbles to the cold end of the regenerative zone for recirculation therethrough, the pebbles being moved at a rate only about sufficiently to maintain the regenerative zone in a self-cleaning state.

3. In a process for cooling a product gas and concurrently removing condensable impurities therefrom by indirect heat exchange with a relatively cool purge gas by passage through a pebble-packed regenerative zone, the steps comprising passing a relatively warm impurity-laden product inlet gas from the warm end to the cold end of said pebble-packed regenerative zone as a gas cooling and cleaning stroke to cool such inlet gas below the saturation temperature of such impurities for deposition in such zone; discharging the impurity-depleted cooled inlet gas from the cold end of such zone; as a gas purge stroke, passing a relatively cool purge gas stream from the cold to the warm end of the regenerative zone to simultaneously evaporate the previously deposited impurities for removal, and recool the regenerative zone; and controlling the heat transfer and cleaning in the regenerative zone so as to achieve substantially complete removal of the inlet gas impurities by moving the pebbles from the cold end to the warm end of the regenerative zone so as to increase the vapor pressure and evaporation rate of the deposited impurities, withdrawing the pebbles from the warm end, recooling the withdrawn pebbles to remove the sensible heat abstracted from the relatively warm product gas, and returning the recooled pebbles to the cold end of the regenerative zone for recirculation therethrough, the pebbles being moved at a rate only about sufficiently to maintain the regenerative zone in a self-cleaning state.

4. A process according to claim 2 for cooling a product inlet gas and concurrently removing condensable impurities therefrom, in which the pebbles withdrawn from the warm end of the regenerative zone are heated to remove any remaining product inlet gas impurities therefrom before recirculation to the cold end of such zone.

5. A process according to claim 2 for cooling a product inlet gas and concurrently removing condensable impurities therefrom in which the pebbles withdrawn from the warm end of the regenerative zone are heated and any remaining product gas impurities are combusted therefrom before recirculation of the pebbles to the cold end of such zone.

6. In a process for cooling a product inlet gas and concurrently removing condensable impurities therefrom by indirect heat exchange with a relatively cool purge gas by passage through pebble-packed regenerative zones, the steps comprising passing a relatively warm impurity-laden product inlet gas from the warm end to the cold end of a first pebble-packed regenerative zone as a gas cooling and cleaning stroke to cool such inlet gas below the saturation temperature of such impurities for deposition in such zone; discharging the impurity-depleted cooled inlet gas from the cold end of such zone; as a gas purge stroke, passing a relatively cool purge gas stream from the cold to the warm end of a second pebble-packed regenerative zone to simultaneously evaporate the previously deposited impurities for removal, and recool the second regenerative zone; periodically reversing the relatively warm impurity-laden inlet gas and the relatively cool purge gas flows between the first and second regenerative zones; and controlling the heat transfer and cleaning in the regenerative zones so as to achieve substantially complete removal of the inlet gas impurities by moving the pebbles from one end to the other end of each of the regenerative zones, withdrawing the pebbles from said other end, and returning the pebbles to said one end of the regenerative zones for recirculation therethrough, the pebbles being moved at a rate only about sufficiently to maintain the regenerative zones in a self-cleaning state.

7. A process according to claim 3 for cooling a product inlet gas and concurrently removing condensable impurities therefrom, in which the pebbles withdrawn from the warm end of the regenerative zone are recooled by a portion of said relatively cool purge gas stream before return to the cold end of such zone.

8. In a process for cooling a product inlet gas and concurrently removing condensable impurities therefrom by indirect heat exchange with a relatively cool purge gas by passage through at least four pebble-packed regenerative zones arranged in pairs with the cold end of each zone of such pairs contiguous to the cold end of the other zone of the same pair, the steps comprising passing a relatively warm impurity-laden product inlet gas from the warm ends to the cold ends of a first pair of pebble-packed regenerative zones as a gas cooling and cleaning stroke to cool such inlet gas below the saturation temperature of such impurities for deposition in such zone; discharging the impurity-depleted cooled inlet gas from the cold ends of such zones; as a gas purge stroke, passing a relatively cool purge gas stream from the contiguous cold ends to the warm ends of a second pair of pebble-packed regenerative zones to simultaneously evaporate the previously deposited impurities for removal, and recool the zones; periodically reversing the relatively warm impurity-laden inlet gas and the relatively cool purge gas flows between said first and second pair of regenerative zones; and controlling the heat transfer and cleaning in the regenerative zones so as to achieve substantially complete removal of the inlet gas impurities, by moving the pebbles consecutively from the warm end to the cold end of one regenerative zone of each pair and thence from the contiguous cold end to the warm end of the other regenerative zone of each pair, withdrawing the pebbles from such warm end, and returning the pebbles to the warm end of said one regenerative zone for recirculation therethrough, the pebbles being moved at a rate only about sufficiently to maintain the regenerative zones in a self-cleaning state.

9. In a process for cooling a product inlet gas and concurrently removing condensable impurities therefrom by indirect heat exchange with a relatively cool purge gas by passage through a pebble-packed regenerative zone, the steps comprising passing a relatively warm impurity-laden product inlet gas from the warm end to the cold end of said pebble-packed regenerative zone as a gas cooling and cleaning stroke to cool such inlet gas below the saturation temperature of such impurities for deposition in such zone; discharging the impurity-depleted cooled inlet gas from the cold end of such zone; as a gas purge stroke, passing a relatively cool purge gas stream from the cold to the warm end of the regenerative zone to simultaneously evaporate the previously deposited impurities for removal, and recool the regenerative zone; and controlling the heat transfer and cleaning in the regenerative zone so as to achieve substantially complete removal of the inlet gas impurities, by moving the pebbles from the warm end to the cold end of the regenerative zone, withdrawing the pebbles from the cold end, heating such pebbles to remove any remaining inlet gas impurities therefrom, and returning the pebbles to the warm end of the regenerative zone for passage therethrough, the pebbles being moved at a rate only about sufficiently to maintain the regenerative zone in a self-cleaning state.

10. Apparatus for cooling a product inlet gas and concurrently removing condensable impurities therefrom by indirect heat exchange with a relatively cool purge gas including a pebble-packed regenerator having a warm end and a cold end; means for passing a relatively warm impurity-laden product inlet gas from the warm to the cold end of such regenerator as a gas cooling and cleaning stroke to cool such product gas below the saturation temperature of such impurities for deposition in the regenerator bed; means for passing a relatively cool purge gas stream from the cold to the warm end of the regenerator as a gas purge stroke to simultaneously evaporate the previously deposited impurities for removal, and recool such regenerator; means for controlling the heat transfer and cleaning in the regenerator so as to achieve substantially complete removal of the deposited inlet gas impurities including means for moving the pebbles from one end to the other end of the regenerator; means for withdrawing the pebbles from said other end, and means for returning the pebbles to said one end of the regenerative zone for recirculation therethrough.

11. Apparatus according to claim 10 for cooling a product inlet gas and concurrently removing condensable impurities therefrom, in which the pebble moving means transfer the pebbles through the regenerator from the cold end to the warm end thereof for removal from the warm end and return to the regenerator cold end for passage therethrough.

12. Apparatus according to claim 10 for cooling a product inlet gas and concurrently removing condensable impurities therefrom, in which the pebble moving means transfer the pebbles through the regenerator from the warm end to the cold end thereof for removal from the cold end and return to the regenerator warm end for repassage therethrough.

13. Apparatus according to claim 11 for cooling a product inlet gas and concurrently removing condensable impurities therefrom, in which means are provided for recooling the pebbles withdrawn from the warm end of the regenerator before return to the cold end of such regenerator.

14. Apparatus according to claim 11 for cooling a product inlet gas and concurrently removing condensable impurities therefrom, in which means are provided to heat the pebbles withdrawn from the warm end of the regenerator and thus remove any remaining product gas impurities from the pebbles before return to the cold end of such regenerator.

15. Apparatus according to claim 11 for cooling a product inlet gas and concurrently removing condensable impurities therefrom, in which means are provided to heat the pebbles withdrawn from the warm end of the regenerator and burn any remaining product gas impurities before returning the pebbles to the cold end of such regenerator.

16. Apparatus for cooling a product inlet gas and concurrently removing condensable impurities therefrom by indirect heat exchange with a relatively cool purge gas including at least two pebble-packed regenerators each having a warm end and a cold end; means for passing a relatively warm impurity-laden product inlet gas from the warm to the cold end of a first regenerator as a gas cooling and cleaning stroke to cool such inlet gas below the saturation temperature of such impurities for deposition in the regenerator bed; means for passing a relatively cool purge gas stream from the cold to the warm end of a second regenerator as a gas purge stroke to simultaneously evaporate the previously deposited impurities for removal, and recool such second regenerator; means for periodically reversing the relatively warm impurity-laden inlet gas and the relatively cool purge gas flows between the first and second regenerators; means for controlling the heat transfer and cleaning in the regenerators so as to achieve substantially complete removal of the inlet gas impurities including means for moving the pebbles from the cold end to the warm end of the regenerators, means for withdrawing the pebbles from the regenerator warm ends, and means for returning the pebbles to the regenerator cold ends for recirculation therethrough.

17. Apparatus for cooling a product inlet gas and concurrently removing condensable impurities by indirect heat exchange with a relatively cool purge gas including at least four pebble-packed regenerators arranged in pairs with the cold end of each regenerator of such pairs contiguous to the cold end of the other regenerator of the same pair; means for passing a relatively warm impurity-laden product inlet gas from the warm ends to the cold ends of a first pair of regenerators as a gas cooling and cleaning stroke to cool such product inlet gas below the saturation temperature of such impurities for deposition in the regenerator beds; means for passing a relatively cool purge gas stream from the contiguous cold ends to the warm ends as a gas purge stroke to simultaneously evaporate the previously deposited impurities for removal, and recool such regenerators; means for periodically reversing the relatively warm impurity-laden inlet gas and the relatively cool purge gas flows between the first and second regenerator pair; means for controlling the heat transfer and cleaning in the regenerators so as to achieve substantially complete removal of the inlet gas impurities including means for moving the pebbles consecutively from the warm end to the cold end of one regenerator of each pair and hence from the contiguous cold end to the warm end of the other regenerator of each pair, means for withdrawing the pebbles from such warm end, and means for returning the pebbles to the warm end of said one regenerator of each pair for recirculation therethrough.

References Cited in the file of this patent

UNITED STATES PATENTS

| | | |
|---|---|---|
| 2,537,045 | Garbo | Jan. 9, 1951 |
| 2,696,718 | Garbo | Dec. 14, 1954 |
| 2,735,278 | Rice | Feb. 21, 1956 |